United States Patent
Garavaglia et al.

(10) Patent No.: US 9,071,380 B2
(45) Date of Patent: Jun. 30, 2015

(54) MULTI-POINT CONTROL PROTOCOL PROXY ARCHITECTURE IN A NETWORK WITH OPTICAL AND COAXIAL DOMAINS

(71) Applicant: QUALCOMM Incorporated, San Diego, CA (US)

(72) Inventors: Andrea Garavaglia, Nuremberg (DE); Juan Montojo, Nuremberg (DE); Christian Pietsch, Nuremberg (DE); Stephen J. Shellhammer, Ramona, CA (US); Nicola Varanese, Nuremberg (DE); Patrick Stupar, Nuremberg (DE); Tienchuan Ko, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 13/787,292

(22) Filed: Mar. 6, 2013

(65) Prior Publication Data
US 2013/0236178 A1 Sep. 12, 2013

Related U.S. Application Data

(60) Provisional application No. 61/727,619, filed on Nov. 16, 2012, provisional application No. 61/607,539, filed on Mar. 6, 2012.

(51) Int. Cl.
*H04J 14/00* (2006.01)
*H04J 14/02* (2006.01)
*H04Q 11/00* (2006.01)
*H04L 12/28* (2006.01)

(52) U.S. Cl.
CPC ........ *H04J 14/0227* (2013.01); *H04Q 11/0067* (2013.01); *H04Q 11/0071* (2013.01); *H04Q 2011/0079* (2013.01); *H04L 12/2801* (2013.01); *H04L 12/2869* (2013.01); *H04L 12/2885* (2013.01)

(58) Field of Classification Search
USPC .................................... 398/66, 98, 25, 45, 68
See application file for complete search history.

(56) References Cited

U.S. PATENT DOCUMENTS

| | | | |
|---|---|---|---|
| 7,301,970 B2 | 11/2007 | Kim et al. | |
| 7,551,610 B2 | 6/2009 | Cummings et al. | |

(Continued)

FOREIGN PATENT DOCUMENTS

EP 1786149 A1 * 5/2007

OTHER PUBLICATIONS

International Search Report and Written Opinion—PCT/US2013/029448-ISA/EPO—Jul. 25, 2013.

(Continued)

*Primary Examiner* — Ken Vanderpuye
*Assistant Examiner* — Jose Luis F Pugeda
(74) *Attorney, Agent, or Firm* — Mahamedi Paradice LLP

(57) ABSTRACT

A method of registering a coax network unit (CNU) in a network is performed at an optical-coax unit (OCU). In the method, a first discovery message is broadcasted to a plurality of CNUs. In response, a first registration request is received from a first CNU of the plurality of CNUs. In response to the first registration request, a proxy entity corresponding to the first CNU is implemented in the OCU. A second discovery message is received from an optical line terminal (OLT). In response to the second discovery message, a second registration request is transmitted to the OLT requesting registration of the proxy entity with the OLT.

25 Claims, 13 Drawing Sheets

(56) References Cited

U.S. PATENT DOCUMENTS

| | | | |
|---|---|---|---|
| 8,050,562 B2 | 11/2011 | Lee et al. | |
| 8,831,425 B1* | 9/2014 | Bernstein et al. | 398/70 |
| 2007/0250891 A1 | 10/2007 | Weinstein et al. | |
| 2009/0296733 A1* | 12/2009 | Yu | 370/458 |
| 2011/0058813 A1 | 3/2011 | Boyd et al. | |
| 2011/0078755 A1 | 3/2011 | Dai | |
| 2011/0123193 A1 | 5/2011 | Yamanaka et al. | |
| 2012/0045209 A1* | 2/2012 | Boyd et al. | 398/66 |
| 2012/0243872 A1 | 9/2012 | Haran et al. | |
| 2012/0257892 A1 | 10/2012 | Boyd et al. | |
| 2012/0257893 A1 | 10/2012 | Boyd et al. | |
| 2013/0004155 A1* | 1/2013 | Liang et al. | 398/9 |
| 2013/0142515 A1* | 6/2013 | Chen et al. | 398/67 |
| 2013/0202301 A1* | 8/2013 | Ago et al. | 398/58 |
| 2013/0239165 A1 | 9/2013 | Garavaglia et al. | |

OTHER PUBLICATIONS

McGarry M et al., "Ethernet Passive Optical Network Architectures and Dynamic Bandwidth Allocation Algorithms", IEEE Communications Surveys, IEEE, New York, NY, US, vol. 10, No. 3, Jul. 1, 2008, pp. 46-60, XP011234561, ISSN: 1553-877X, DOI: 10.1109/COMST.2008.4625804.

Sommer J et al., "Ethernet—A Survey on its Fields of Application", IEEE Communications Surveys, IEEE, New York, NY, US, vol. 12, No. 2, Apr. 1, 2010, pp. 263-284, XP011334497, ISSN: 1553-877X, DOI:10.1109/SURV.2010.021110.00086.

Wei S et al., "Test Trial of a New Broadband Access Technology Based on Coaxial Cable Network", Communication Technology (ICCT), 2010 12th IEEE International Conference on, IEEE, Piscataway, NJ, USA, Nov. 11, 2010, pp. 470-472, XP031849909, DOI: 10.1109/ICCT.2010.5688859, ISBN: 978-1-4244-6868-3.

* cited by examiner

MULTI-POINT CONTROL PROTOCOL PROXY ARCHITECTURE IN A NETWORK WITH OPTICAL AND COAXIAL DOMAINS

RELATED APPLICATIONS

This application claims priority to U.S. Provisional Patent Application Nos. 61/727,619, titled "Multi-Point Control Protocol Proxy Architecture in a Network with Optical and Coaxial Components," filed Nov. 16, 2012, and No. 61/607,539, titled "Methods and Systems for Allocating Resources in a Hybrid Fiber-Coaxial Network," filed Mar. 6, 2012, both of which are hereby incorporated by reference in their entirety.

TECHNICAL FIELD

The present embodiments relate generally to communication systems, and specifically to communication systems with both optical fiber links and coaxial cable ("coax") links.

BACKGROUND OF RELATED ART

A network may use both optical fiber and coaxial cable for respective links. For example, the portions of the network that use optical fiber may be implemented using the Ethernet Passive Optical Networks (EPON) protocol, and the EPON protocol may be extended over coaxial cable plants. EPON over coax is called EPoC. The optical fiber part of the network can potentially support a higher data rate than the coax part of the network. Also, different coax parts of the network (e.g., different cable plants) may have different maximum data rates.

In view of these different data rates, there is a need for coordinating resource allocation between the optical fiber and coax parts of the network.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
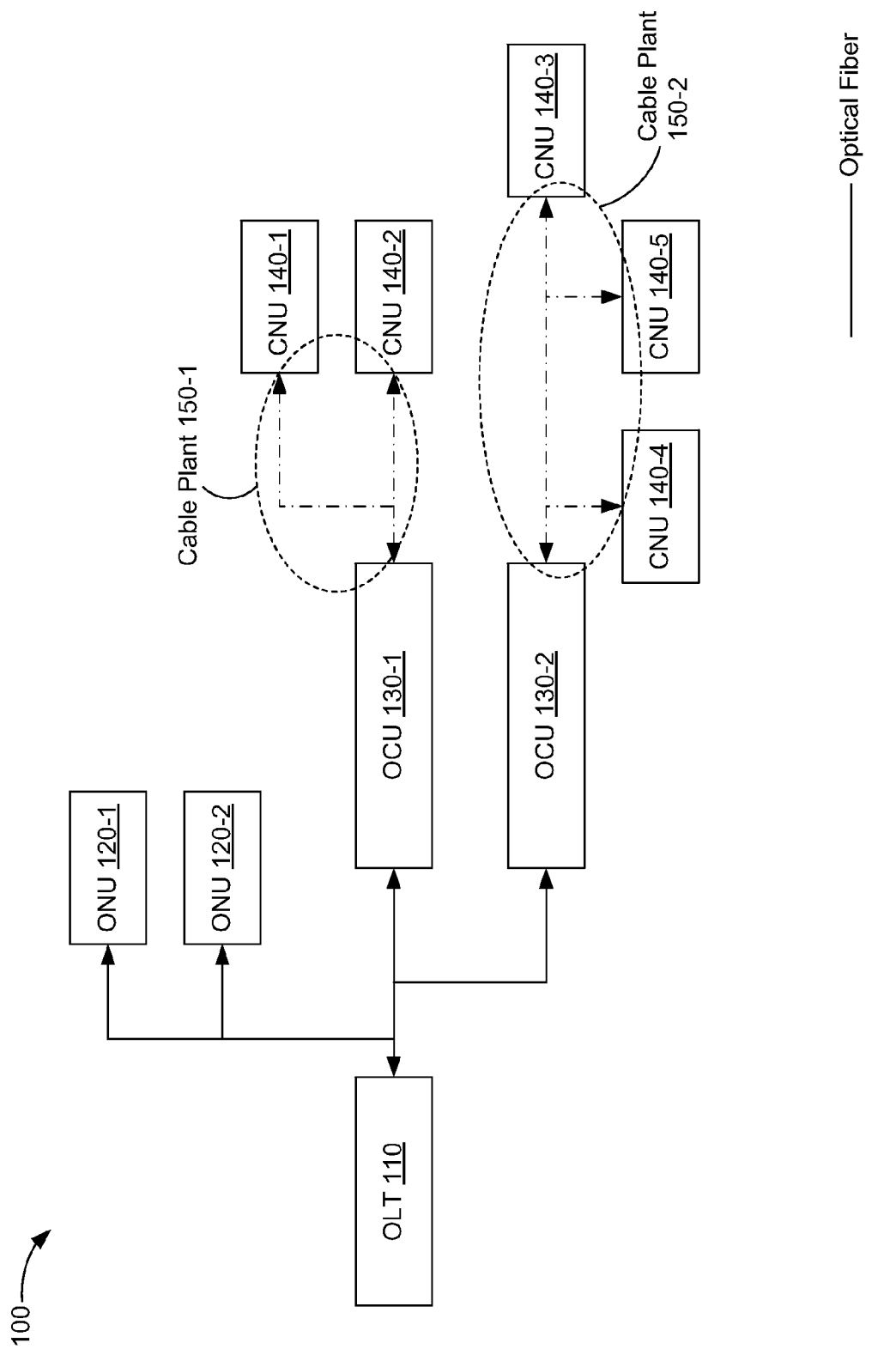
FIG. 1 is a block diagram of a network that includes both optical fiber links and coax links in accordance with some embodiments.

Embodiments are disclosed in which an optical-coax unit (OCU) includes proxy entities corresponding to respective coax network units (CNUs) to which the OCU is coupled.

In some embodiments, a method performed at an OCU includes broadcasting a first discovery message to a plurality of CNUs. In response to the first discovery message, a first registration request is received from a first CNU of the plurality of CNUs. In response to the first registration request, a proxy entity corresponding to the first CNU is created. A second discovery message is received from an optical line terminal (OLT); in response, a second registration request is transmitted to the OLT requesting registration of the proxy entity with the OLT.

In some embodiments, an OCU includes a coax physical layer device to be coupled to a plurality of CNUs and an optical physical layer device to be coupled to an OLT. The OCU also includes one or more processors and memory storing one or more programs configured to be executed by the one or more processors. The one or more programs include instructions to broadcast discovery messages to the plurality of CNUs and instructions to create proxy entities corresponding to respective CNUs in response to registration requests from the respective CNUs. The registration requests are received from the respective CNUs in response to the broadcasted discovery messages. The one or more programs also include instructions to transmit registration requests to the OLT requesting registration of the proxy entities with the OLT, in response to discovery messages received from the OLT.

In some embodiments, a non-transitory computer-readable storage medium stores one or more programs configured to be executed by one or more processors of an OCU. The one or more programs include instructions to broadcast discovery messages to a plurality of CNUs and instructions to create proxy entities corresponding to respective CNUs in response to registration requests from the respective CNUs. The registration requests are received from the respective CNUs in response to the broadcasted discovery messages. The one or more programs also include instructions to transmit registration requests to an OLT requesting registration of the proxy entities with the OLT, in response to discovery messages received from the OLT.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1 is a block diagram of a network 100 that includes both optical fiber links and coax links in accordance with some embodiments. The network 100 includes an optical line terminal (OLT) 110 (which may also be referred to as an optical link terminal) coupled to a plurality of optical network units (ONUs) 120-1 and 120-2 via respective optical fiber links. The OLT 110 also is coupled to a plurality of optical-coax units (OCUs) 130-1 and 130-2 via respective optical fiber links. The OCUs 130-1 and 130-2, which may also be referred to as fiber-coax units (FCUs), media converters, or coax media converters (CMCs), convert downstream optical signals from the OLT 110 into electrical signals and transmit the electrical signals downstream to coax network units (CNUs) via respective coax links. In the example of FIG. 1, a first OCU 130-1 transmits converted signals to CNUs 140-1 and 140-2, and a second OCU 130-2 transmits converted signals to CNUs 140-3, 140-4, and 140-5. The OCUs 130-1 and 130-2 also convert upstream electrical signals from respective ones of the CNUs 140-1 through 140-5 into optical signals and transmit the optical signals upstream to the OLT 110. The coax links coupling the first OCU 130-1 to CNUs 140-1 and 140-2 compose a first cable plant 150-1. The coax links coupling the second OCU 130-2 to CNUs 140-3 through 140-5 compose a second cable plant 150-2. In some embodiments, the OLT 110, ONUs 120-1 and 120-2, and OCUs 130-1 and 130-2 are implemented in accordance with the Ethernet Passive Optical Network (EPON) protocol. In some embodiments, the OLT 110 transmits optical signals using time-domain multiplexing (TDM), such that different time slots are used to transmit packets addressed to different network elements.

In some embodiments, the OLT 110 is located at the network operator's headend, the ONUs 120 and CNUs 140 are located at the premises of respective users, and the OCUs 130 are located at the headends of respective cable plant operators. Alternatively, OCUs 130 may be located within cable plants.

In some embodiments, each ONU 120 (e.g., each of the ONUs 120-1 and 120-2) and each OCU 130 (e.g., each of the OCUs 130-1 and 130-2) in the network 100 receives data at the same data rate. The ONUs 120 and OCUs 130 each receive all of the packets transmitted by the OLT 110. For unicast transmissions, each ONU 120 receives every packet transmitted by the OLT 110, but selects only the packets addressed to it, and discards all packets that are not addressed to it.

For unicast transmissions, the OCUs 130 also receive every packet transmitted by the OLT 110, but filter out the packets not addressed to CNUs 140 in their respective cable plants 150. For example, the OCU 130-1 receives every packet transmitted by the OLT 110 but forwards only those packets addressed to the CNUs 140-1 and 140-2 in the cable plant 150-1. The OCU 130-1 forwards each packet addressed to one of the CNUs 140-1 and 140-2 in the cable plant 150-1 to every CNU 140-1 and 140-2 in the cable plant 150-1. Each CNU 140-1 and 140-2 selects the packets addressed to it and discards other packets. The OCU 130-2 and CNUs 140-3 through 140-5 in the cable plant 150-2 function similarly.

In some embodiments, the network 100 is implemented using a multi-point control protocol (MPCP) proxy architecture, in which proxy entities for various network elements (e.g., the OLT 110 and various CNUs 140) are implemented in each OCU 130-1 and 130-2.

Figure 2:
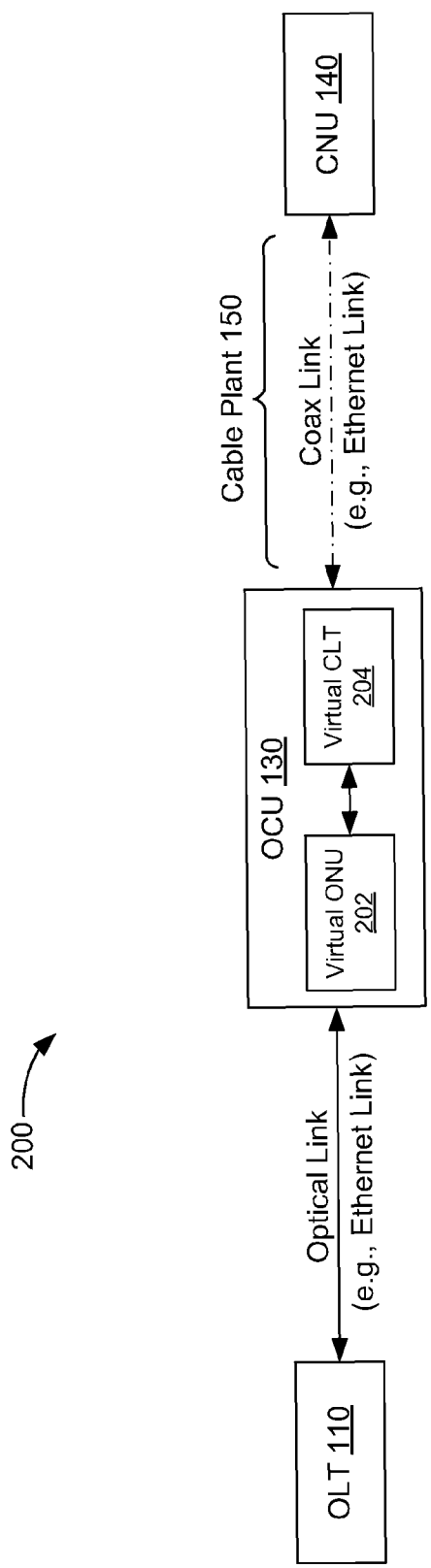
FIG. 2 is a block diagram of a portion of the network of FIG. 1 in which an optical-coax unit is used to implement a multi-point control protocol (MPCP) proxy architecture in accordance with some embodiments.

FIG. 2 is a block diagram of network 200 that is an example of a portion of the network 100 (FIG. 1). The network 200 includes an OCU 130 (e.g., OCU 130-1 or 130-2, FIG. 1) used to implement an MPCP proxy architecture in accordance with some embodiments. The OCU 130 includes an instantiation (i.e., an implementation) of a virtual ONU 202 and an instantiation (i.e., an implementation) of a virtual coax line terminal (CLT) 204. The virtual ONU 202 is coupled to the OLT 110 through an optical link (e.g., with an Ethernet link set up on it) and the virtual CLT 204 is coupled to a plurality of CNUs 140 (only one is shown in FIG. 2 for simplicity) through coax links (e.g., with Ethernet links set up on them) in a cable plant 150. The virtual ONU 202 and virtual CLT 204 are coupled within the OCU 130 as shown. The OCU 130 thus acts as an MPCP proxy of the OLT 110 with respect to the CNU 140 and as an MPCP proxy of the CNU 140 with respect to the OLT 110. Each proxy entity in the OCU 130 (e.g., the virtual CLT 204 and the virtual ONU 202) responds on behalf of the network element (e.g., the OLT 110 or a respective CNU 140) that it represents. In some embodiments, each proxy entity in the OCU 130 generates protocol frames.

The network 200 thus emulates two Ethernet point-to-point (P2P) links in cascade between the OLT 110 and CNU 140, with separate optical and coax point-to-multipoint (P2MP) domains, in accordance with some embodiments. There are two time domains and separated resource allocation.

In some embodiments, the OCU 130 includes a separate virtual ONU 202 for each CNU 140 registered with the OCU 130. Each virtual ONU 202 is a proxy entity for its respective CNU 140.

Figure 3:
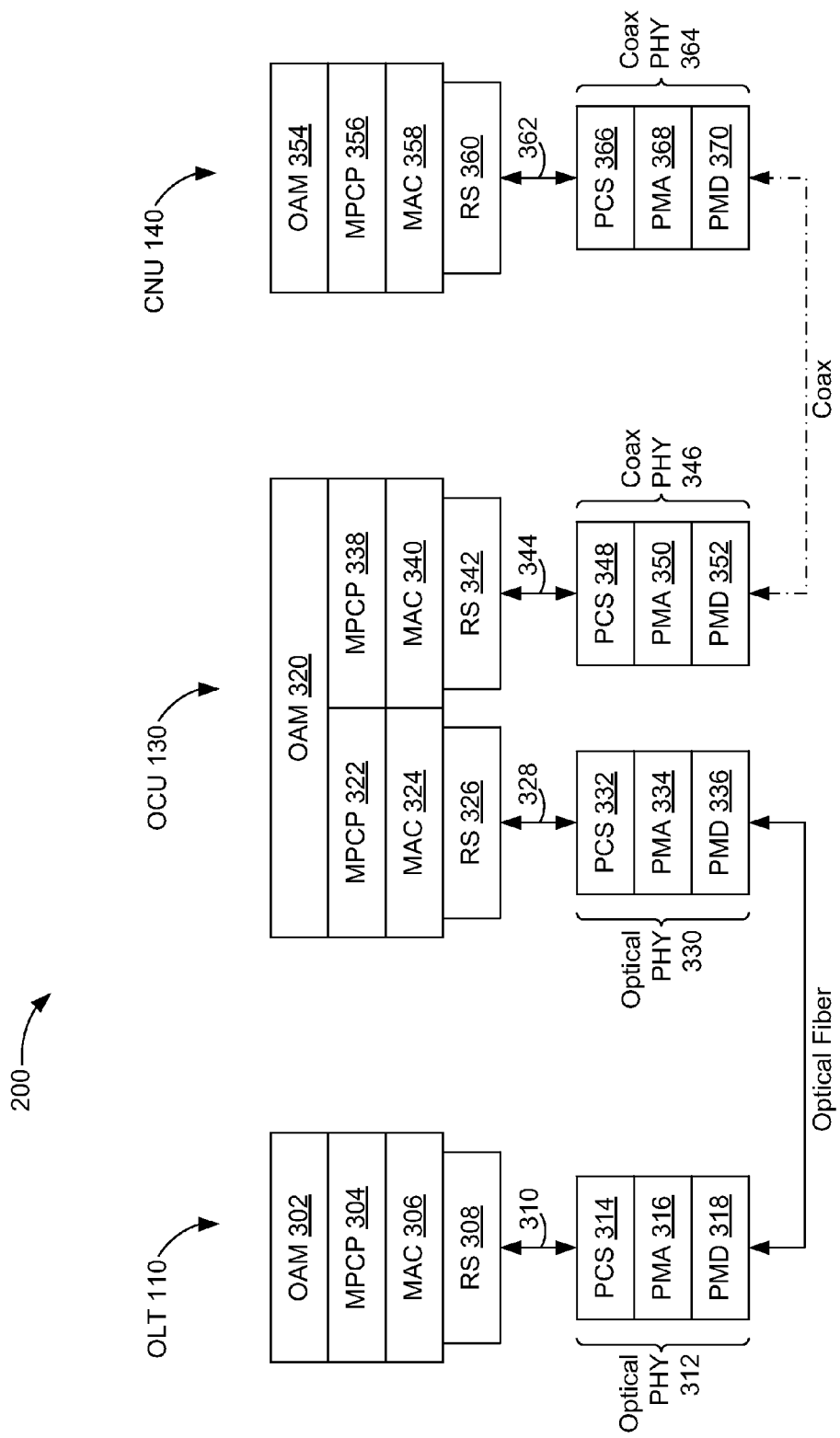
FIG. 3 illustrates a protocol stack for an MPCP proxy architecture such as in the network of FIG. 2 in accordance with some embodiments.

FIG. 3 illustrates protocol stacks for an MPCP proxy architecture for the network 200 (FIG. 2) in accordance with some embodiments. A protocol stack for the OLT 110 includes an operations, administration, and management (OAM) layer 302, an MPCP layer 304, a media access control (MAC) layer 306, a reconciliation sublayer (RS) 308, and an optical physical layer (PHY) 312, stacked as shown. In some embodiments, the optical PHY 312 includes a physical coding sublayer (PCS) 314, a physical medium attachment (PMA) sublayer 316, and a physical medium dependent (PMD) sublayer 318. The optical PHY 312 is coupled to the MAC layer 306 through a media-independent interface 310 (e.g., XGMII) and the RS 308.

The protocol stack for the OCU 130 includes an MPCP layer 322, MAC layer 324, RS 326, and optical PHY 330 for communicating with the OLT 110. In some embodiments, the optical PHY 330 includes a PCS 332, a PMA sublayer 334, and a PMD sublayer 336. The MAC layer 324 is coupled to the optical PHY 330 through the RS 326 and a media-independent interface 328 (e.g., XGMII). The OCU 130 also includes an MPCP layer 338, MAC layer 340, RS 342, and coax PHY 346 for communicating with the CNU(s) 140. In some embodiments, the coax PHY 346 includes a PCS 348, a PMA sublayer 350, and a PMD sublayer 352. The MAC layer 340 is coupled to the coax PHY 346 through the RS 342 and a media-independent interface 344 (e.g., XGMII). The MPCP layer 322, MAC layer 324, RS 326, and optical PHY 330 correspond to virtual ONUs 202 (FIG. 2) in the OCU 130. The MPCP layer 338, MAC layer 340, RS 342, and coax PHY 346 correspond to the virtual CLT 204 (FIG. 2) in the OCU 130. The OCU 130 includes a single OAM layer 320 shared between the virtual ONUs 202 and virtual CLT 204.

The protocol stack for the CNU 140 includes an OAM layer 354, MPCP layer 356, MAC layer 358, RS 360, and coax PHY 364 stacked as shown. In some embodiments, the coax PHY 364 includes a PCS 366, a PMA sublayer 368, and a PMD sublayer 370. The MAC layer 358 is coupled to the coax PHY 364 through the RS 360 and a media-independent interface 362 (e.g., XGMII). The CNU 140 may support frequency-division duplexing (FDD) (e.g., on active and/or passive cable plants 150) and/or time-division duplexing (TDD) (e.g., on passive coax cable plants 150).

The OCU 130 (FIGS. 1-3) maps CNUs 140 to virtual ONUs 202 and buffers related to the virtual ONUs 202. The OLT 110 (FIGS. 1-3) manages fiber resources for (e.g., allocates fiber resource to) the virtual ONUs 202 in the OCU 130, as well as for regular ONUs 120 (e.g., ONUs 120-1 and 120-2, FIG. 1) in the network 100 (FIG. 1). The OCU 130 (e.g., the virtual CLT 204, FIG. 2) manages coax resources for (e.g., assigns coax resources to) respective CNUs 140 on its cable plant 150. The OCU 130 may support FDD (e.g., on active and/or passive cable plants 150) and/or TDD (e.g., on passive coax cable plants 150).

Figure 4A:
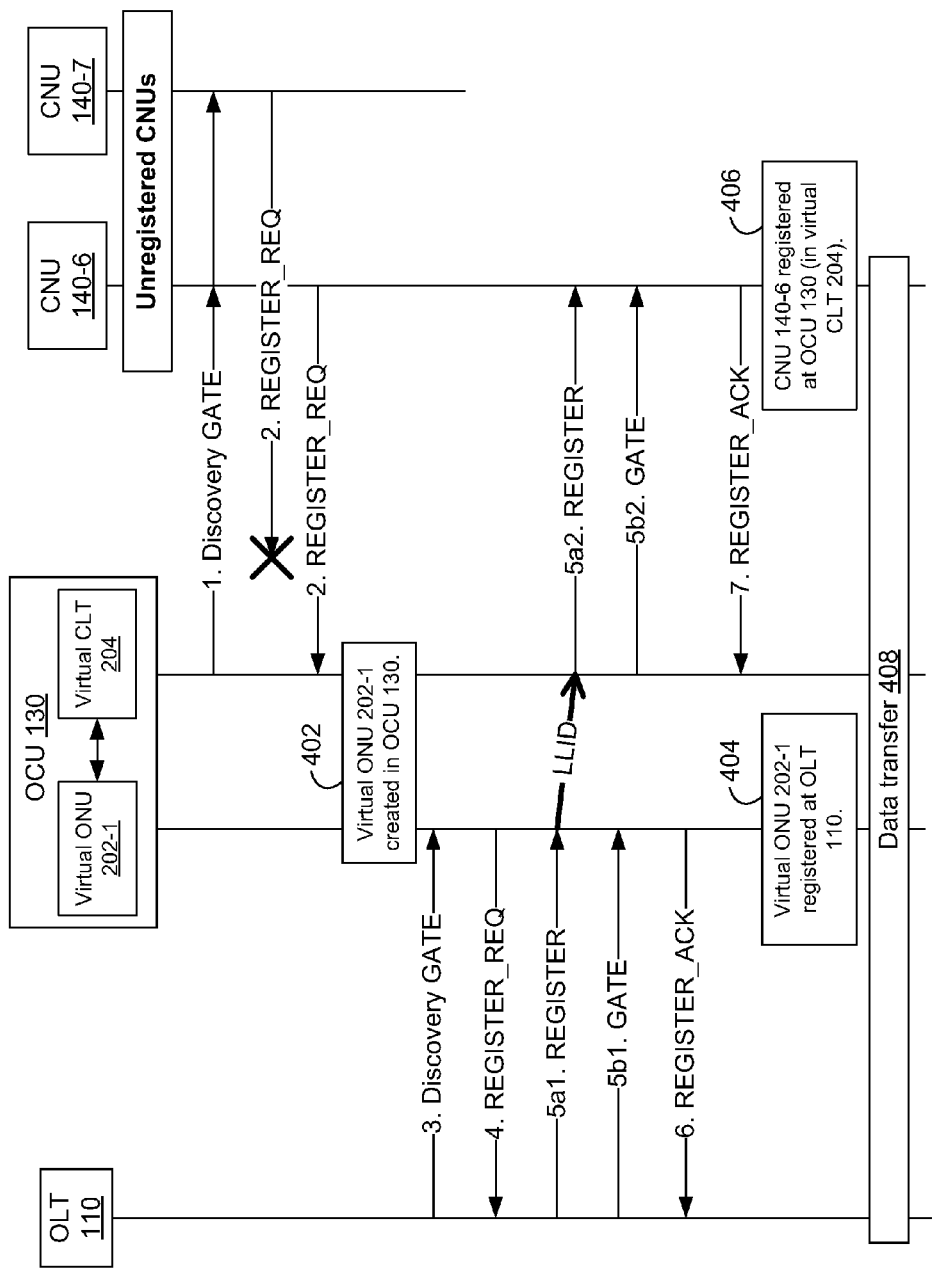
FIG. 4A illustrates an auto-discovery and registration sequence for the networks of FIGS. 1-3 in accordance with some embodiments.

FIG. 4A illustrates an auto-discovery and registration sequence for the network 200 (FIGS. 2 and 3) in accordance with some embodiments. The OCU 130 is coupled to a plurality of CNUs 140, including CNUs 140-6 and 140-7. The CNUs 140-6 and 140-7 may be examples of respective ones of the CNUs 140-1 and 140-2 on the cable plant 150-1 or of the CNUs 140-3 through 140-5 on the cable plant 150-2 (FIG. 1). At the beginning of this sequence, CNU 140-6 and CNU 140-7 are both unregistered with the OCU 130 and OLT 110. The OCU 130 periodically distributes (e.g., broadcasts) special GATE messages, called discovery GATE messages, to trigger registration of unregistered CNUs 140. At step 1, the OCU 130 distributes one of these discovery GATE messages. At step 2, unregistered CNU 140-6 and CNU 140-7 both attempt to reply, competing for upstream bandwidth for registration request (REGISTER_REQ) messages. In the example of FIG. 4A, the CNU 140-6 succeeds in transmitting its REGISTER_REQ message to the OCU 130, but the CNU 140-7 fails. When the OCU 130 decodes the REGISTER_REQ message from the CNU 140-6, it creates (402) a virtual ONU 202-1 corresponding to the CNU 140-6. The CNU 140-7 may try to respond to a subsequent discovery GATE message during a subsequent time slot.

The OLT 110 periodically distributes discovery GATE messages to trigger registration of unregistered virtual ONUs 202 (FIG. 2) and regular ONUs 120 (e.g., ONUs 120-1 and 120-2, FIG. 1). At step 3, the OLT 110 distributes one of these discovery GATE messages. For example, the discovery GATE message of step 3 is the first discovery GATE message distributed by the OLT 110 after creation of the virtual ONU 202-1. At step 4, the virtual ONU 202-1 replies with a registration request (REGISTER_REQ) message (assuming the virtual ONU 202-1 succeeded in competing for upstream bandwidth). When the OLT 110 decodes the REGISTER_REQ message from the virtual ONU 202-1, it replies to the virtual ONU 202-1 in step 5a1 with a registration (REGISTER) message that assigns one or more unique identifiers (e.g. logical link identifiers or LLIDs) to the virtual ONU 202-1 and/or to the CNU 140-6. In some embodiments, the one or more unique identifiers (e.g. LLIDs) include respective identifiers (e.g. LLIDs) for respective levels of service in accordance with a quality-of-service (QoS) scheme. The OCU 130 forwards the REGISTER message to the CNU 140-6 in step 5a2. The OCU 130 may forward the one or more identifiers (e.g. LLIDs) to the CNU 140-6 in the forwarded REGISTER message.

After sending the REGISTER message in step 5a1, the OLT 110 sends (e.g., immediately sends) a unicast GATE message to the virtual ONU 202-1 in step 5b1. The OCU 130 forwards the unicast GATE message to the CNU 140-6 in step 5b2.

The virtual ONU 202-1 replies to the OLT 110 with a registration acknowledgment (REGISTER_ACK) message in step 6. Upon receipt of the REGISTER_ACK message by the OLT 110, the virtual ONU 202-1 is registered (404) with the OLT 110. In some embodiments, the virtual ONU 202-1 sends the REGISTER_ACK message to the OLT 110 without waiting for a REGISTER_ACK message from the CNU 140-6.

The CNU 140-6 replies to the forwarded GATE message of step 5b2 with its own REGISTER_ACK message in step 7. Upon receipt of this REGISTER_ACK message at the OCU 130 (e.g., at the virtual CLT 204), the CNU 140-6 is registered (406) with the OCU 130 (e.g., is registered in the virtual CLT 204). End-to-end data transfer 408 now can occur between the OLT 110 and CNU 140-6, because the CNU 140-6 and virtual ONU 202-1 are respectively registered with the OCU 130 and OLT 110.

Respective messages in the registration and auto-discovery sequence of FIG. 4A correspond, for example, to messages specified in clause 77.3.3 of the IEEE 802.3 standard.

In some embodiments, the time window (i.e., time slot) reserved for registration in the procedure of FIG. 4A uses only a portion of the available coax frequency spectrum. The portion of the available coax frequency spectrum used for registration may be fixed or may follow a changing pattern.

In some embodiments, the REGISTER_REQ message from the CNU 140-6 in step 2 specifies capabilities of the CNU 140-6.

In some embodiments, the unicast GATE and REGISTER_ACK messages in steps 5b2 and 7 trigger the CNU 140-6 to assess and share Channel Quality Indication (CQI) information. For example, the downstream channel is assessed in the coax PHY 364 (FIG. 3) of the CNU 140-6 based on known pilot tones received from the OCU 130. This assessment may be triggered by the unicast GATE message of step 5b2. The channel assessment may be communicated to the OCU 130 in the REGISTER_ACK message from the CNU 140-6 in step 7. The unicast GATE message of steps 5b1 and 5b2 may also trigger transmission of a wide-band upstream message to be used by the OCU 130 and/or OLT 110 to assess the upstream channel.

Implementing the MPCP proxy architecture of FIGS. 2 and 3 involves making two separate round-trip-time (RTT) measurements, one for the optical domain and one for the coax domain. RTT measurements in this context refer to measurement of RTT at the MPCP level. In some embodiments, the RTT measurement for the optical domain is performed in accordance with the EPON standard (IEEE 802.3av).

Figure 4B:
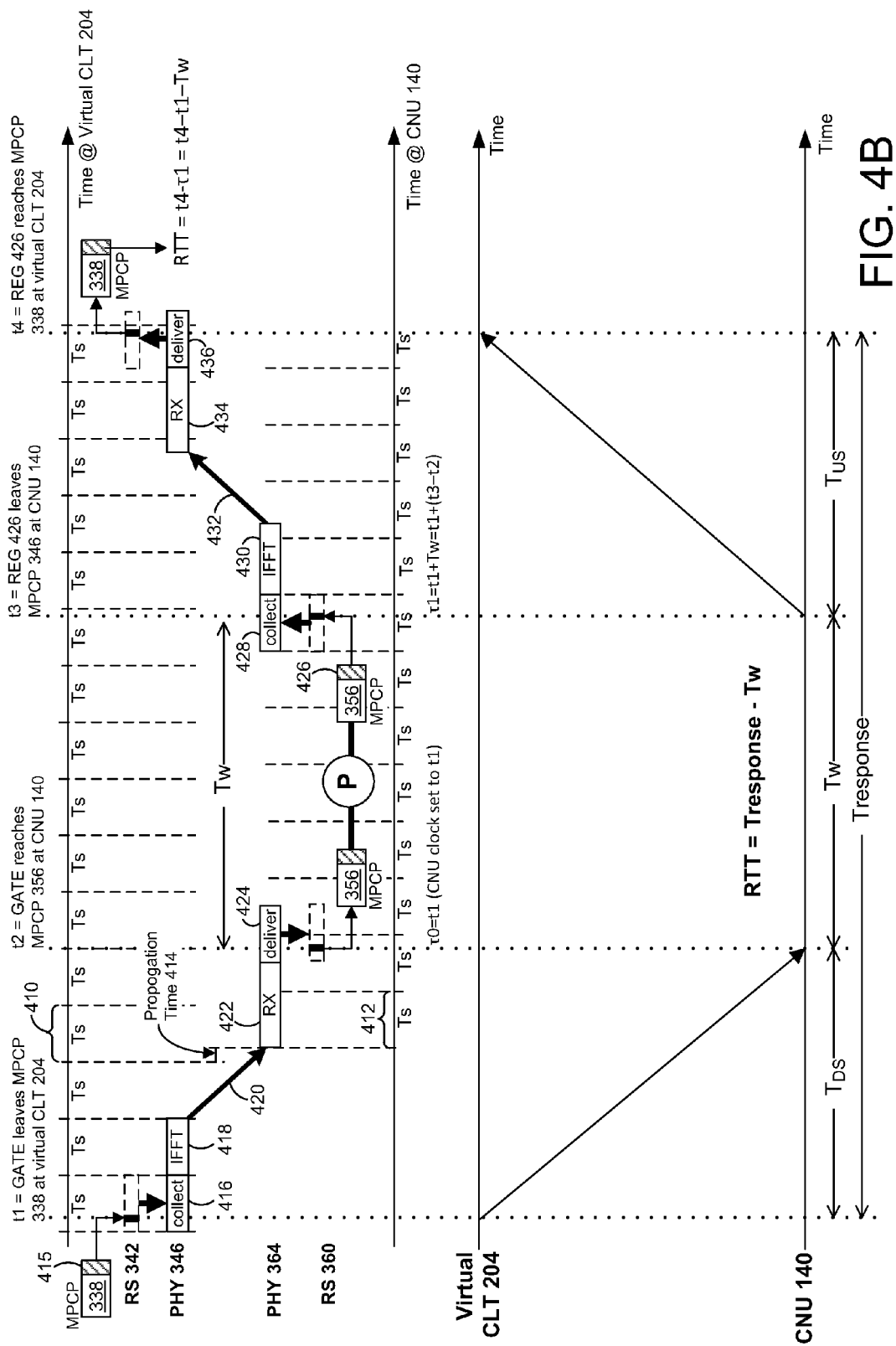
FIG. 4B illustrates a round-trip-time measurement in the coax domain in accordance with some embodiments.

FIG. 4B illustrates an RTT measurement in the coax domain in accordance with some embodiments. Successive time slots 410 at a virtual CLT 204 (FIG. 2) and successive time slots 412 at a CNU 140 (FIG. 2) have a duration Ts. The time slots 412 at the CNU 140 are offset from the time slots 410 at the virtual CLT 204 by a propagation time 414 between the virtual CLT 204 and the CNU 140. At time t1, a GATE message 415 (time-stamped with t1) leaves the MPCP layer 338 of the virtual CLT 204 and is provided through the RS 342 to the coax PHY 346 of the virtual CLT 204, which performs data collection 416 and implements an IFFT 418 to generate an OFDMA symbol, which is transmitted as a downstream (DS) signal 420 to the CNU 140. The coax PHY 364 of the CNU 140 receives (422) the GATE message 415 and delivers it (424) at a time t2 through the RS 360 to the MPCP layer 356 of the CNU. A downstream transmission time $T_{DS}$ includes the OFDMA symbol construction, encoding, and transmission time for the GATE message 415 in the virtual CLT 204, the downstream propagation time for the signal 420, and the time for the reception 422 and delivery 424 in the CNU 140.

Upon receipt of the GATE message 415 in the MPCP layer 356, a clock is set to time t1 and starts to run. The CNU processes ("P") the GATE message 415; the MPCP layer 356 then provides a response message (REG) 426 through the RS 360 to the coax PHY 364. The MPCP layer 356 provides the response message 426 at a time t3, when the clock time in the MPCP layer 356 is τ1=t1+Tw=t1+t3−t2. The coax PHY 364 performs data collection 428 and implements an IFFT 430 to generate an OFDMA signal, which is transmitted as an upstream signal 432 to the virtual CLT 204.

The coax PHY 346 of the virtual CLT 204 receives (434) the response message 426 and delivers it (436) through the RS 342 to the MPCP layer 338 of the virtual CNU 140 at a time t4. An upstream transmission time $T_{US}$ includes the OFDMA symbol construction, encoding, and transmission time for the response message 426 in the CNU 140, the upstream propagation time for the upstream signal 432, and the reception 434 and delivery 436 in the virtual CLT 204. The MPCP layer 338 determines the RTT using the formula:

$$RTT = t4 - \tau1 = t4 - t1 - Tw = t4 - t1 - (t3 - t2) = Tresponse - Tw \quad (1)$$

where t4−t1=Tresponse and t3−t2=Tw.

Figure 5A:
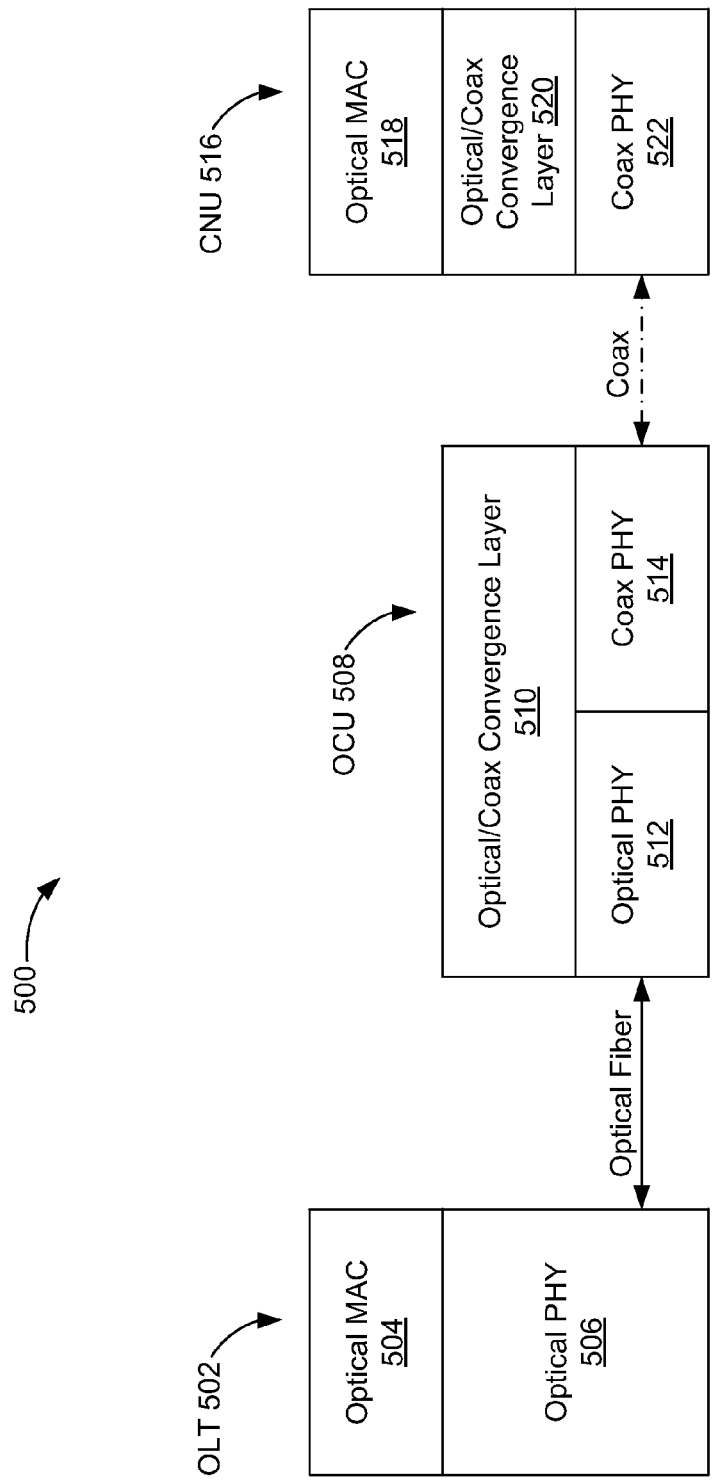
FIG. 5A is a block diagram of an example of a network that includes both optical fiber links and coax links and has an MPCP proxy architecture in accordance with some embodiments.

Two examples of MPCP proxy architectures, which are also referred to as one-network architectures, are now disclosed. FIG. 5A is a block diagram of a first MPCP proxy architecture 500 in accordance with some embodiments. In the architecture 500, an OLT 502 is coupled to a CNU 516 through an OCU 508. The OLT 502, OCU 508, and CNU 516 are respectively examples of an OLT 110, OCU 130, and CNU 140. While FIG. 5A only shows a single OCU 508 and CNU 516 for visual clarity, in practice the architecture 500 may include multiple OCUs 508 coupled to the OLT 502, and each OCU 508 is coupled to a plurality of CNUs 516 through coax links.

In the architecture 500, each CNU 516 includes an implementation (also referred to as an instantiation) of an optical media access control (MAC) layer 518 (e.g., an Ethernet MAC layer that includes an EPON MPCP sublayer and is thus referred to herein as an EPON MAC layer). The implementation of the optical MAC layer 518 is also referred to as a media access controller 518 or MAC 518. Each CNU 516 also includes a coax PHY 522 (e.g., an EPoC PHY, where EPoC refers to an EPON-compatible protocol over coax) to transmit and receive signals via the coax link that couples the CNU 516 to the OCU 508. Each CNU 516 further includes an implementation (i.e., instantiation) of an optical-to-coax convergence layer 520 that interfaces between the coax PHY 522 and the optical MAC 518. In some embodiments, the optical-to-coax convergence layer 520 is an EPON-to-EPoC convergence layer.

The OCU 508 includes an optical PHY 512 (e.g., an EPON PHY) to transmit and receive signals via the optical link that couples the OCU 508 to the OLT 502, and a coax PHY 514 (e.g., an EPoC PHY) to transmit and receive signals via the coax link that couples the OCU 508 to the CNU 516. The OCU 508 also includes an implementation (i.e., instantiation) of an optical-to-coax convergence layer 510 that interfaces between the optical PHY 512 and coax PHY 514. The convergence layer 510 manages transactions between the optical PHY 512 at the OCU 508 and the optical MAC 518 at the CNU 516.

The OLT 502 includes an optical PHY 506 (e.g., an EPON PHY) to transmit and receive signals via the optical link that couples the OLT 502 to the OCU 508. The OLT 502 also includes an optical MAC 504 (e.g., an EPON MAC).

Figure 5B:
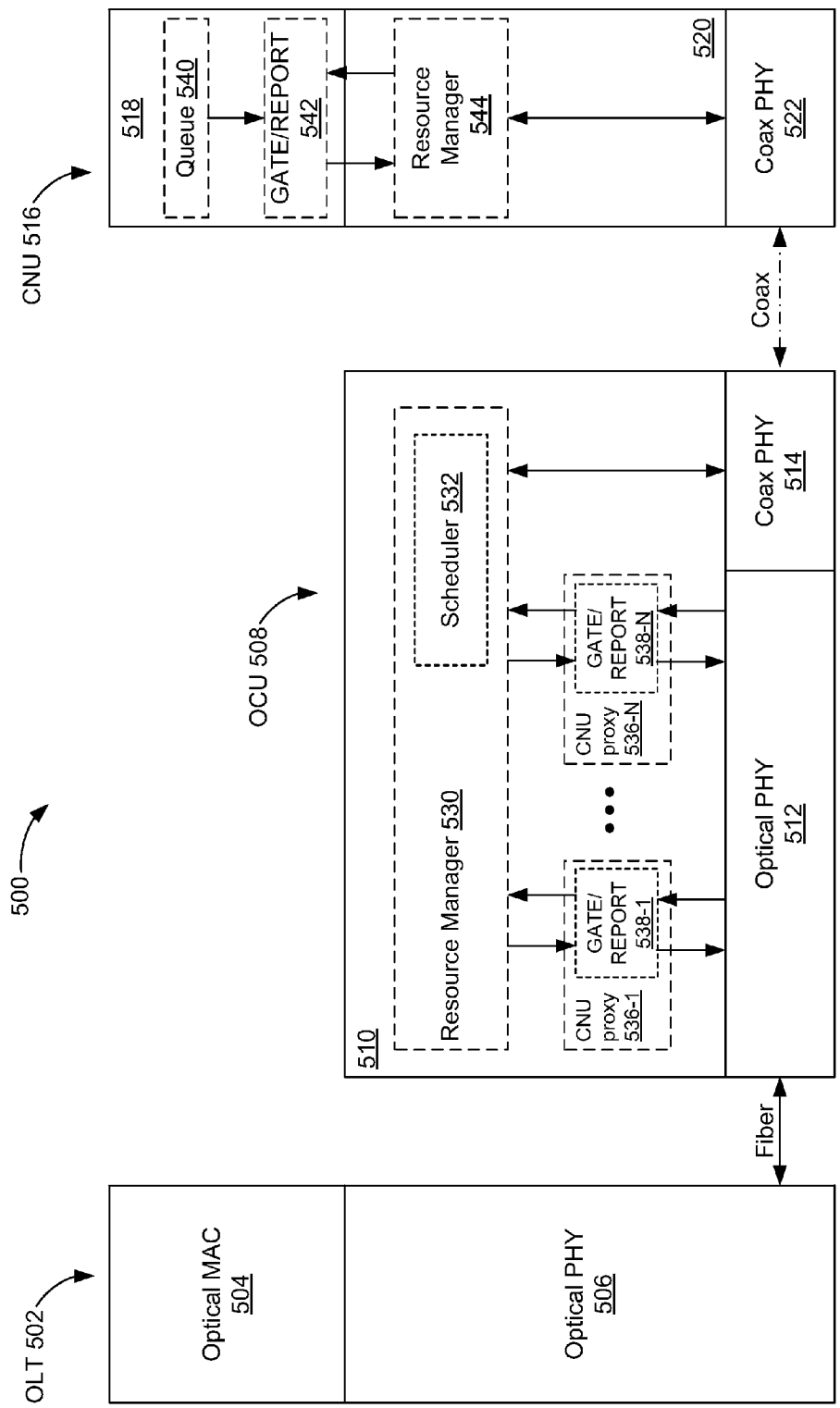
FIG. 5B is a more detailed block diagram of the network of FIG. 5A.

FIG. 5B is a more detailed block diagram of the MPCP proxy architecture 500 of FIG. 5A in accordance with some embodiments. As shown in FIG. 5B, the convergence layer 510 in the OCU 508 includes a plurality of CNU proxy entities 536-1 through 536-N, where N is the number of CNUs (e.g., registered CNUs) 516 in the corresponding cable plant 150 (FIGS. 1 and 2). Each proxy entity 536 (i.e., each of the proxy entities 536-1 through 536-N) thus corresponds to a respective CNU 516. In some embodiments, the proxy entities 536 are used to convey EPON MAC functions over coax. For example, the proxy entities 536 perform time stamping, REPORT/GATE message processing, registration and deregistration, and packet filtering/forwarding on a per-CNU basis. In the architecture 500, the presence of an optical MAC 518 in the CNU 516 means that a virtual ONU resides in each CNU 516. The proxy entities 536 provide interfaces to these virtual ONUs.

The convergence layer 510 in the OCU 508 also includes a resource manager 530, and the convergence layer 520 in the CNU 516 includes a corresponding resource manager 544. A queue 540 in the optical MAC 518 of the CNU 516 queues packets for upstream transmission to the OLT 502. The queue 540 reports its status (including, for example, the number of queued packets and thus its length) to a message processing element 542 ("GATE/REPORT") in the MAC 518, which sends a REPORT message reporting the queue status to the resource manager 544 of the convergence layer 520. The resource manager 544 sends the REPORT message to the resource manager 530 in the convergence layer 510 of the OCU 508, which forwards the REPORT message to the proxy entity 536 corresponding to the CNU 516 that sent the REPORT message. In some embodiments, the proxy entity 536 captures the REPORT message in a message processing element 538 (e.g., message processing element 538-1 for proxy entity 536-1 or message processing element 538-N for proxy entity 536-N) and updates its record of the queue status, and also transmits the REPORT message upstream to the OLT 502. Alternatively, the OCU 508 processes the REPORT message locally and generates a GATE message to the CNU 516 to grant upstream data transmission to the CNU 516.

The OLT 502 determines resource allocation over the optical link (e.g., in accordance with received REPORT messages) and transmits GATE messages allocating the resources. The message processing elements 538 of the proxy entities 536 capture GATE messages corresponding to their respective CNUs 516 and request coax resources from the resource manager 530. The resource manager 530 allocates coax resources (e.g., using its scheduler 532) and transmits GATE messages allocating the resources to the resource manager 544 in the CNU 516, which forwards the GATE messages to the message processing element 542 of the optical MAC 518. The optical MAC 518 at the CNU 516 thus is instructed to employ the coax resources allocated to it. Packets are transmitted from the CNU 516 to the OLT 502 in accordance with the allocated coax and optical fiber resources, with buffering performed as needed by the convergence layer 510 in the OCU 508. In some embodiments, coax packets are larger than optical packets, and the convergence layer 510 breaks a single coax packet into multiple optical packets for upstream transmission to the OLT 502.

In some embodiments, the architecture 500 is implemented as a single multi-point domain, in which the scheduler 532 in the convergence layer 510 is implemented as a slave of the OLT 502. The OLT 502 allocates timeslots for transmissions over the optical fiber link (e.g., as specified by GATE messages), and the scheduler 532 allocates coax resources based on the allocated optical timeslots. In other embodiments, the architecture 500 is implemented as a double multi-point domain, in which the scheduler 532 monitors queue lengths for respective CNUs 516 and allocates coax resources accordingly. For example, the proxy entities 536 report the queue lengths of their respective CNUs 516 to the scheduler 532, which allocates coax resources accordingly. In either case, the convergence layer 510 provides consistency between optical fiber resource allocation and coax resource allocation. For double multi-point domain architectures, the convergence layer 510 infers the optical fiber resource allocation based on queue lengths.

Figure 6A:
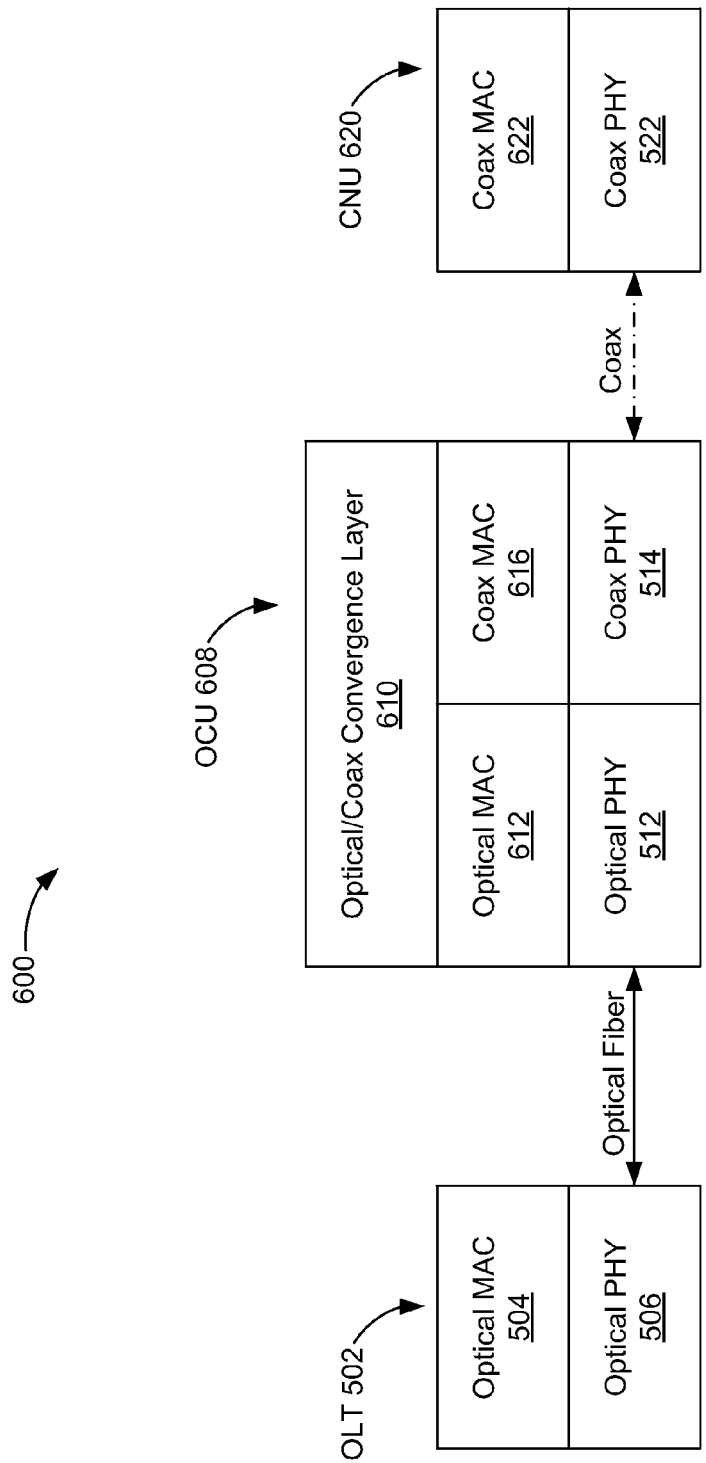
FIG. 6A is a block diagram of another example of a network that includes both optical fiber links and coax links and has an MPCP proxy architecture in accordance with some embodiments.

FIG. 6A is a block diagram of a second MPCP proxy architecture 600 in accordance with some embodiments. In the architecture 600, an OLT 502 is coupled to a CNU 620 through an OCU 608. The OLT 502, OCU 608, and CNU 620 are respectively examples of an OLT 110, OCU 130, and CNU 140. While FIG. 6A only shows a single OCU 608 and CNU 620 for visual clarity, in practice the architecture 600 may include multiple OCUs 608 coupled to the OLT 502, and each OCU 608 is coupled to a plurality of CNUs 620 through coax links.

The OCU 608 includes implementations (or instantiations) of an optical MAC (e.g., EPON MAC) layer 612, an optical-to-coax (e.g., EPON/EPoC) convergence layer 610, and a coax (e.g., EPoC) MAC layer 616, in addition to optical and coax PHYs 512 and 514. The convergence layer 610 manages transactions between the optical MAC 612 and the coax MAC 616; it performs this management through the standard interfaces of the optical MAC 612 and the coax MAC 616. The CNU 620 does not include an optical MAC and corresponding convergence layer as for the CNU 516 (FIG. 5A), but instead includes an implementation of a coax (e.g., EPoC) MAC layer 622 coupled to a coax PHY 522. Because the optical MAC layer 612 is implemented in the OCU 608, a virtual ONU for each of the CNUs 620 in a corresponding cable plant 150 (FIGS. 1 and 2) resides at the OCU 608. In addition, the OCU 608 itself may also be associated with a virtual ONU. Furthermore, because a coax MAC layer 616 is implemented in the OCU 608, a virtual CLT resides at the OCU 608.

Figure 6B:
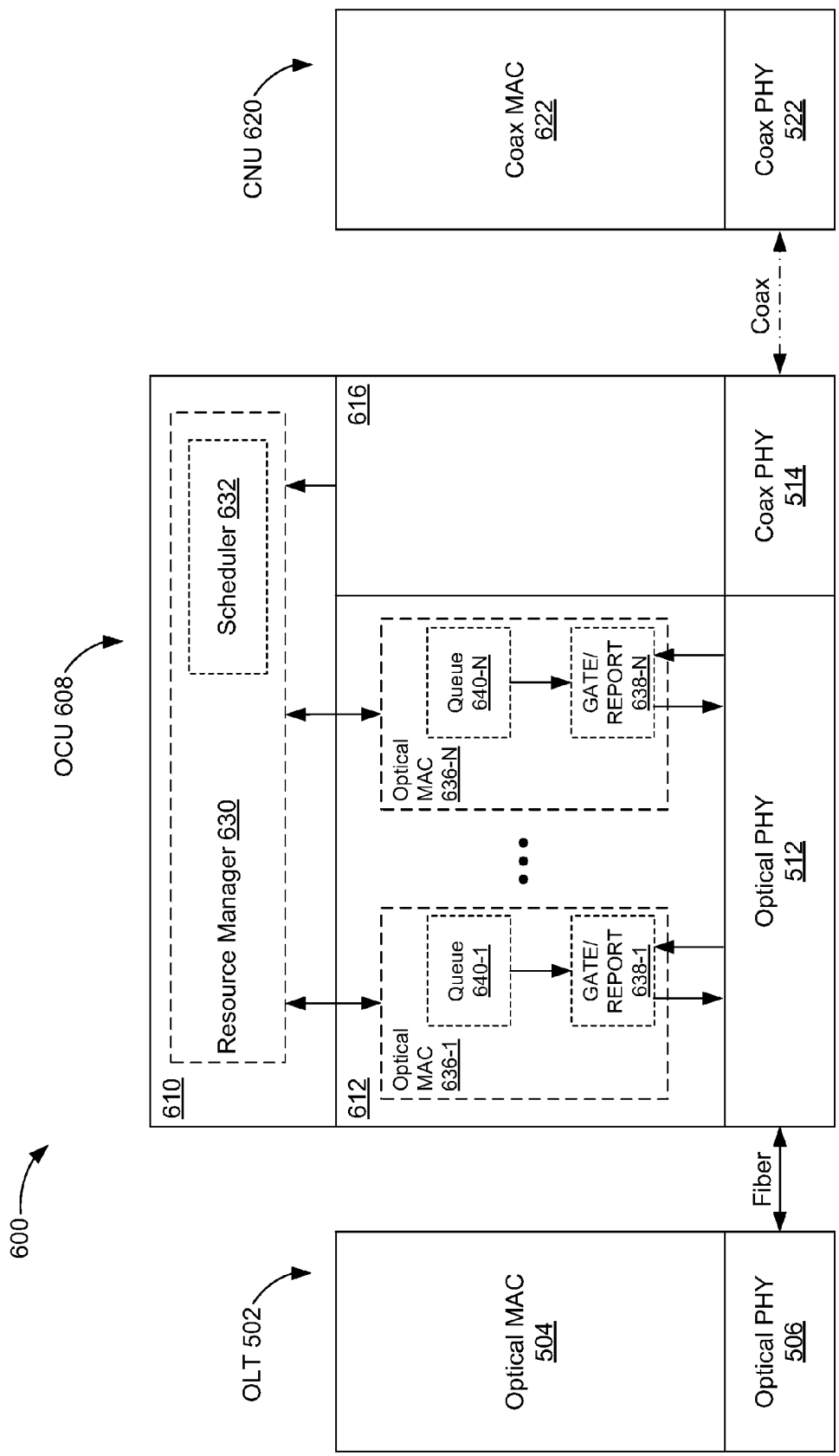
FIG. 6B is a more detailed block diagram of the network of FIG. 6A.

FIG. 6B is a more detailed block diagram of the one-network architecture 600 of FIG. 6A in accordance with some embodiments. As shown in FIG. 6B, the optical MAC 612 includes implementations (i.e., instantiations) of optical (e.g., EPON) MAC layers 636-1 through 636-N ("MAC entities 636-1 through 636-N") for each of the N CNUs 620 in the corresponding cable plant 150 (FIGS. 1 and 2). Each of these optical MAC entities 636-1 through 636-N includes a queue 640-1 through 640-N for buffering upstream packet transmissions from the corresponding CNU 620 and a message processing unit 638-1 through 638-N for processing messages from the corresponding CNU 620. Each of these optical MAC entities 636-1 through 636-N thus is an example of a proxy entity for a respective CNU 620. The convergence layer 610 includes a resource manager 630 with a scheduler 632.

Each queue 640-1 through 640-N reports its status (e.g., its length, and thus the number of pending packets) to the corresponding message processing unit 638-1 through 638-N, which sends REPORT messages reporting the queue status to the OLT 502. Each message processing unit 638-1 through 638-N also receives GATE messages specifying optical fiber resource allocation from the OLT 502 (via the optical PHY 512) and instructs its MAC entity 636-1 through 636-N to transmit upstream packets in accordance with the resource allocation specified by the GATE messages. (In some embodiments, the EPON MAC entities 636-1 through 636-N also perform the time stamping, registration and de-registration, and packet filtering and forwarding functions discussed with regard to the convergence layer 510 of FIGS. 5A-5B).

The scheduler 632 monitors the status (e.g., the lengths) of the queues 640-1 through 640-N and allocates coax resources accordingly. For example, the scheduler 632 sends messages to the coax MAC layer 622 in the CNU 620 instructing it to transmit upstream packets in accordance with the coax resource allocation. These packets are queued in the corresponding queue 640 (i.e., a corresponding one of the queues 640-1 through 640-N) in the OCU 608 for further upstream transmission to the OLT 502. The architecture 600 thus is a double multi-point domain architecture: the convergence layer 610 infers the optical fiber resource allocation based on queue lengths.

Figure 7A:
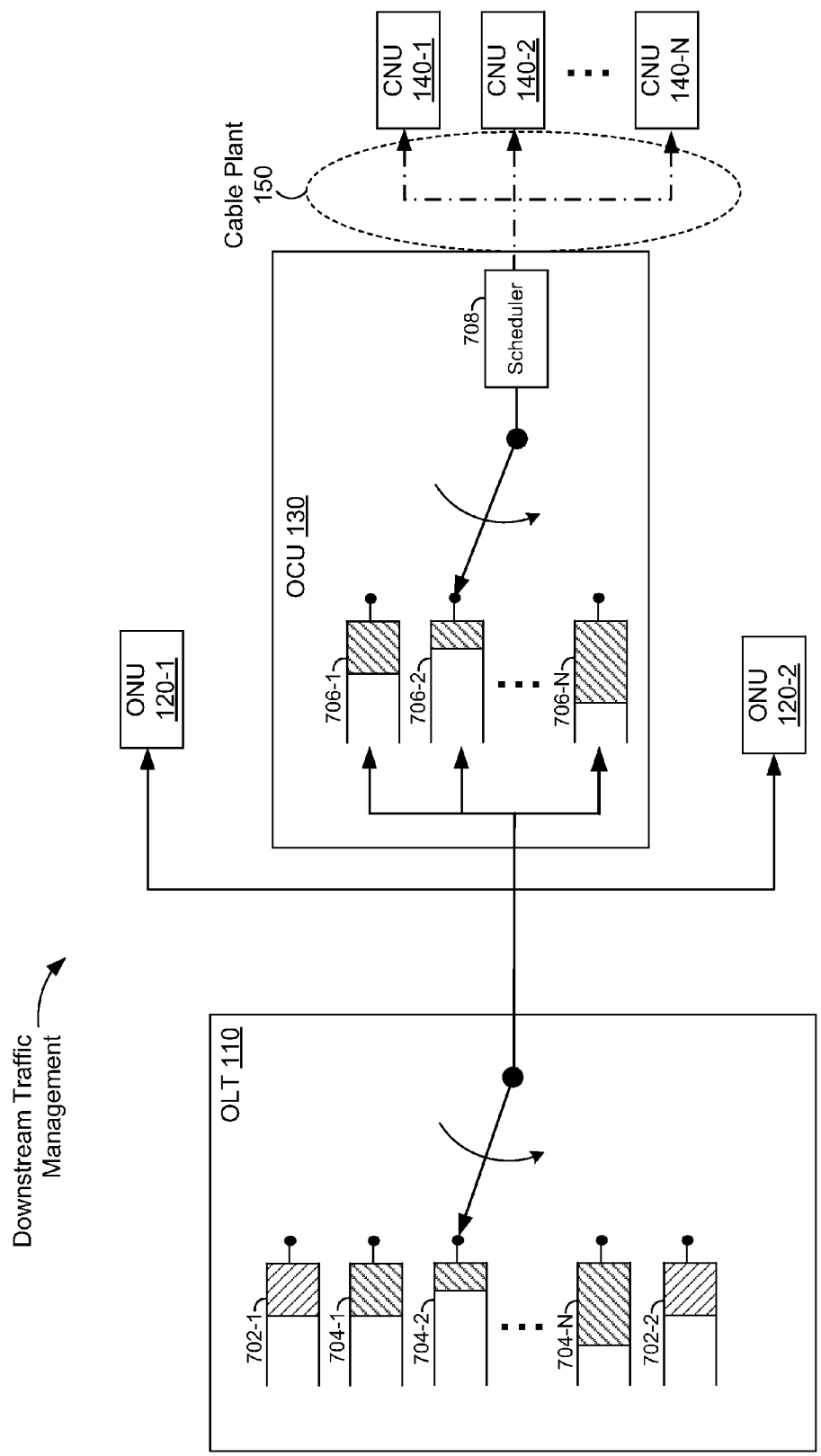
FIG. 7A illustrates downstream traffic management in an MPCP proxy architecture such as in the network of FIGS. 2 and 3 in accordance with some embodiments.

FIG. 7A illustrates downstream traffic management in an MPCP proxy architecture such as in the network 200 (FIGS. 2 and 3) in accordance with some embodiments. This downstream traffic management is an example of downstream dynamic bandwidth allocation (DBA). The OLT 110 buffers downstream packet traffic in respective queues corresponding to respective real and virtual ONUs. For example, a queue 702-1 in the OLT 110 corresponds to a real ONU 120-1 and a queue 702-2 corresponds to a real ONU 120-2. Queues 704-1 through 704-N correspond to respective virtual ONUs (e.g., virtual ONUs 202, FIG. 2) in one or more OCUs 130. The respective virtual ONUs correspond in turn to respective CNUs 140-1 through 140-N. The OLT 110 implements a scheduling algorithm to allocate downstream bandwidth to the queues 702-1, 702-2, and 704-1 through 704-N, and buffered traffic in these queues is transmitted downstream in accordance with the scheduling.

Packets from the queues 704-1 through 704-N in the OLT 110 are transmitted to the OCU 130 (assuming the corresponding CNUs 140-1 through 140-N are on the cable plant 150 of the OCU 130 and registered with the OCU 130), where they are buffered in respective queues 706-1 through 706-N. Each of the queues 706-1 through 706-N in the OCU 130 corresponds to a respective virtual ONU (e.g., a virtual ONU 202, FIG. 2) implemented in the OCU 130 and thus to a respective one of the CNUs 140-1 through 140-N. A scheduler 708 in the OCU 130 (e.g., implemented in the MPCP layer 338, FIG. 3) performs resource allocation, including allocation of downstream bandwidth among the queues 706-1 through 706-N. Packets buffered in the queues 706-1 through 706-N are transmitted downstream to respective CNUs 140-1 through 140-N using the allocated downstream bandwidth.

Figure 7B:
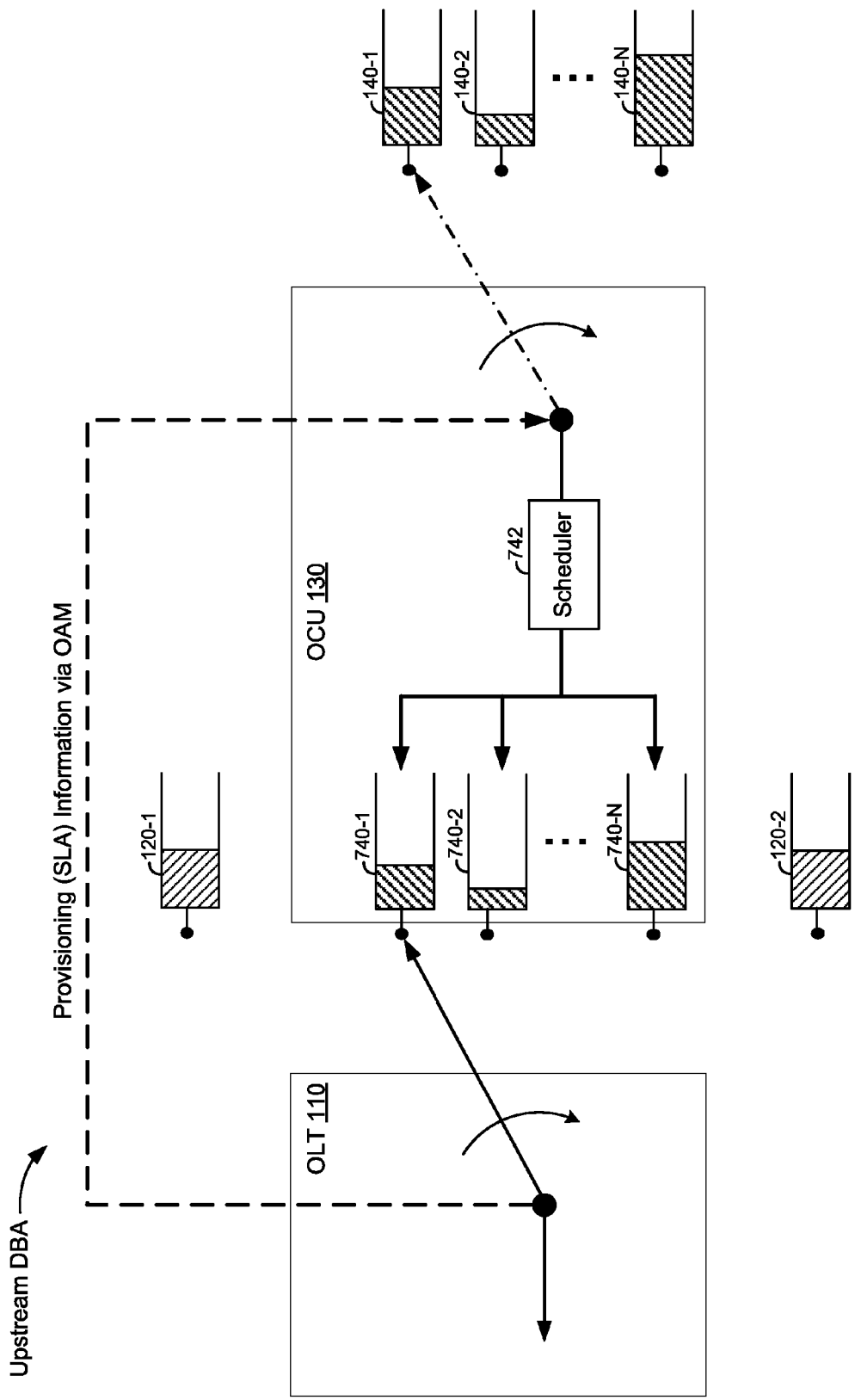
FIG. 7B illustrates upstream dynamic bandwidth allocation in an MPCP proxy architecture such as in the network of FIGS. 2 and 3 in accordance with some embodiments.

FIG. 7B illustrates upstream DBA in an MPCP proxy architecture such as in the network of FIGS. 2 and 3 in accordance with some embodiments. A scheduler 742 in the OCU 130 (e.g., implemented in the MPCP layer 338, FIG. 3) allocates upstream bandwidth among respective CNUs 140-1 through 140-N on the cable plant of the OCU 130. The CNUs 140-1 through 140-N, which buffer packets for upstream transmission in respective internal queues, use the allocated bandwidth to transmit the packets upstream to the OCU 130. The OCU 130 buffers the packets in respective queues 740-1 through 740-N. Each of the respective queues 740-1 through 740-N in the OCU 130 corresponds to a respective virtual ONU (e.g., a virtual ONU 202, FIG. 2) in the OCU 130. In some embodiments, the queues 740-1 through 740-N are examples of the queues 640-1 through 640-N (FIG. 6B). A scheduler in the OLT 110 allocates upstream bandwidth among the queues 740-1 through 740-N (e.g., among the corresponding virtual ONUs), and the buffered packets in the queues 740-1 through 740-N are transmitted upstream from the OCU 130 to the OLT 110 using the allocated bandwidth.

Figure 8:
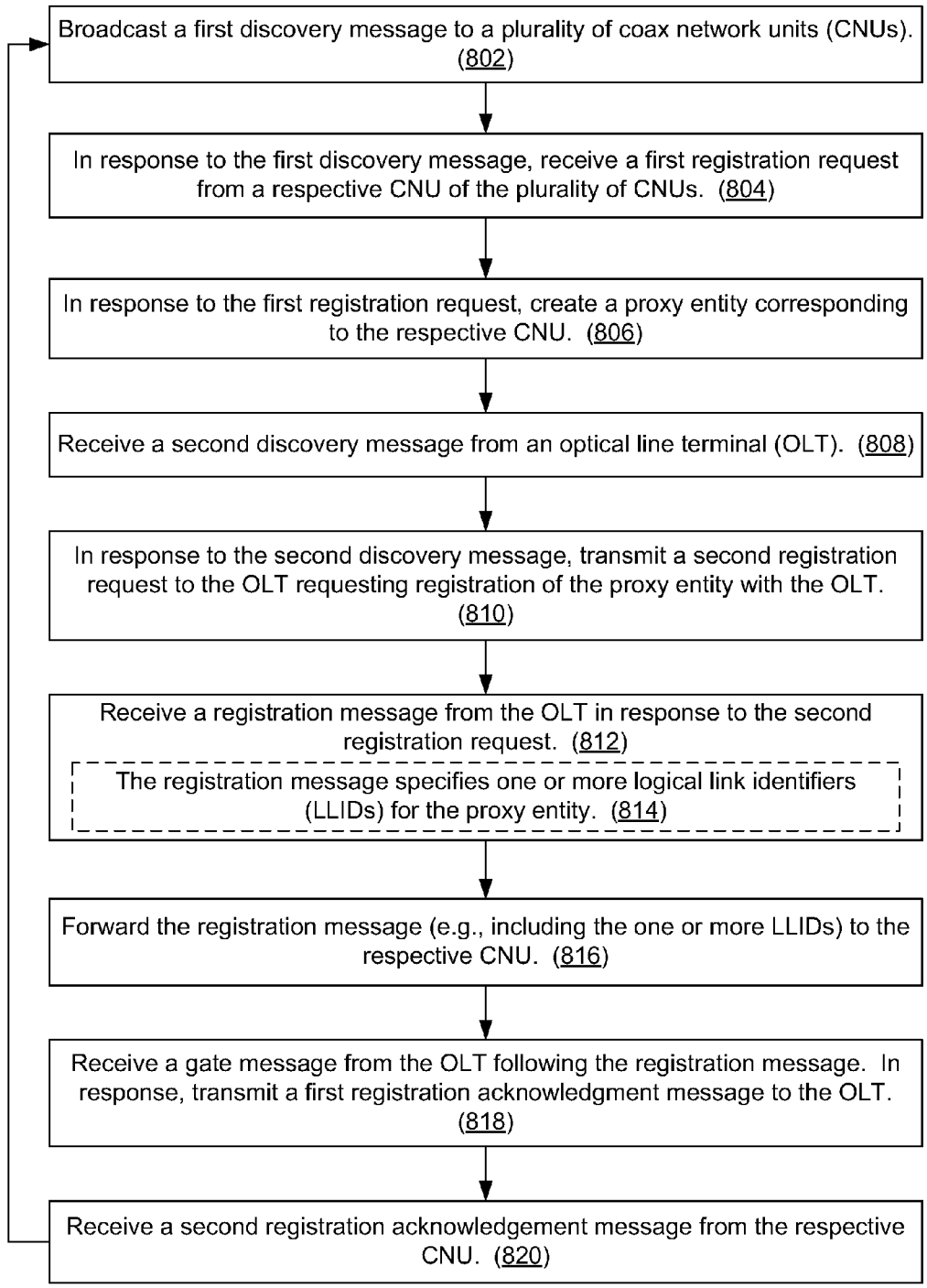
FIG. 8 is a flowchart showing a method of operating an optical-coax unit in accordance with some embodiments.

FIG. 8 is a flowchart showing a method 800 of operating an OCU 130 (FIGS. 1-4A and 7A-7B) in accordance with some embodiments. The method 800 is performed at an OCU 130. In the method 800, a first discovery message is broadcasted (802) to a plurality of CNUs 140 (e.g., to CNUs 140-6 and 140-7 in step 1 of FIG. 4A). In response to the first discovery message, a first registration request is received (804) from a respective CNU 140 of the plurality of CNUs 140 (e.g., in step 2 of FIG. 4A). In response to the first registration request, a proxy entity (e.g., a virtual ONU 202, FIG. 2) is created (806) corresponding to the respective CNU 140.

A second discovery message is received (808) from an OLT 110 (e.g., in step 3 of FIG. 4A). In response to the second discovery message, a second registration request is transmitted (810) to the OLT 110 requesting registration of the proxy entity with the OLT 110 (e.g., in step 4 of FIG. 4A).

A registration message is received (812) from the OLT 110 in response to the second registration request (e.g., in step 5a1 of FIG. 4A). In some embodiments, the registration message specifies (814) one or more LLIDs for the proxy entity. For example, the one or more LLIDs may include LLIDs corresponding to different levels of service in accordance with a quality-of-service (QoS) scheme. The registration message (e.g., including the one or more LLIDs) is forwarded (816) to the respective CNU 140 (e.g., in step 5a2 of FIG. 4A).

A gate message is received (818) from the OLT 110 following the registration message (e.g., in step 5b1 of FIG. 4A). In response, a first registration acknowledgment message is transmitted (818) to the OLT 110 (e.g., in step 6 of FIG. 4A). The gate message may also be forwarded to the respective CNU 140 (e.g., in step 5b2 of FIG. 4A).

A second registration acknowledgement message is received (820) from the respective CNU 140 (e.g., in step 7 of FIG. 4A). The second registration acknowledgement message may be received (820) after the first registration acknowledgment message is transmitted (818), such that the OCU 130 does not wait for the second registration acknowledgement message from the respective CNU 140 before transmitting the first registration acknowledgment message to the OLT 110.

The method 800 may be repeated to register additional CNUs 140 and create additional proxy entities corresponding to the additional CNUs 140.

In some embodiments, the proxy entity queues traffic from the respective CNU 140 (e.g., in one of the queues 640-1 through 640-N, FIG. 6B) (e.g., in one or the queues 740-1 through 740-N, FIG. 7B). Once the proxy entity and respective CNU have been registered in accordance with the method 800, the proxy entity sends REPORT messages to the OLT 110 reporting how much traffic is queued in the proxy entity. In response, the OLT 110 allocates bandwidth to the proxy entity, which uses the bandwidth to transmit the traffic upstream to the OLT 110.

In some embodiments, once the proxy entity and respective CNU have been registered in accordance with the method 800, the proxy entity receives REPORT messages from the respective CNU 140 reporting how much traffic is queued in the respective CNU 140. The proxy entity sends REPORT messages reporting this traffic to the OLT 110. In response, the OLT 110 allocates bandwidth to the proxy entity. The OCU 130 allocates bandwidth to the respective CNU 140, based either on the REPORT messages from the respective CNU 140 or the bandwidth allocation from the OLT 110.

While the method 800 includes a number of operations that appear to occur in a specific order, it should be apparent that the method 800 can include more or fewer operations, some of which can be executed serially or in parallel. An order of two or more operations may be changed, performance of two or more operations may overlap, and two or more operations may be combined into a single operation.

Figure 9A:
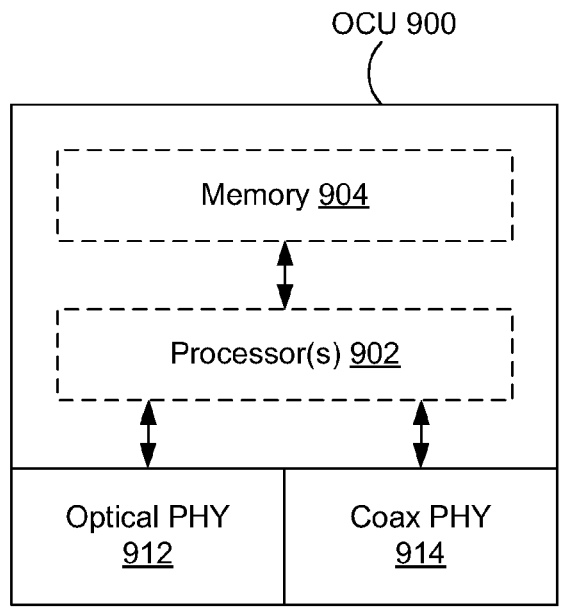
FIG. 9A is a block diagram of an optical-coax unit in accordance with some embodiments.

In some embodiments, one or more of the protocol layers disclosed herein (e.g., all of the non-PHY protocol layers) are implemented in software. For example, FIG. 9A is a block diagram of an OCU 900 in a network such as the network 100 (FIG. 1) in accordance with some embodiments. The OCU 900 is an example of an OCU 130 (FIGS. 1-4A and 7A-7B) (e.g., OCU 508, FIGS. 5A-5B, or OCU 608, FIGS. 6A-6B). In the OCU 900, the optical PHY 912 and coax PHY 914 are coupled to one or more processors (e.g., processor cores) 902, which are coupled in turn to memory 904. In some embodiments, the memory 904 includes a non-transitory computer-readable medium (e.g., one or more nonvolatile memory elements, such as EPROM, EEPROM, Flash memory, a hard disk drive, and so on) that stores instructions for execution by the one or more processors 902. In the example of FIG. 3, the instructions include instructions that, when executed by the processor(s) 902, cause the OCU 900 to implement the functionality of the OAM layer 320, MPCP layers 322 and 338, and MAC layers 324 and 340. In the example of the OCU 508 (FIGS. 5A-5B), the instructions include instructions that, when executed by the processor(s) 902, cause the OCU 900 to implement the functionality of the optical-to-coax convergence layer 510. In the example of the OCU 608 (FIGS. 6A-6B), the instructions include instructions that, when executed by the processor(s) 902, cause the OCU 900 to implement the functionality of the optical-to-coax convergence layer 610, the optical MAC 612, and/or the coax MAC 616. In the example of FIGS. 7A and 7B, the instructions include instructions that, when executed by the processor(s) 902, cause the OCU 900 to implement the functionality of the queues 706-1 through 706-N, the scheduler 708, the queues 740-1 through 740-N, and/or the scheduler 742. In some embodiments, the instructions include instructions that, when executed by the processor(s) 902, cause the OCU 900 to perform all or a portion of the method 800 (FIG. 8).

While the memory 904 is shown as being separate from the processor(s) 902, all or a portion of the memory 904 may be embedded in the processor(s) 902. In some embodiments, the processor(s) 902 and/or memory 904 are implemented in the same integrated circuit as the optical PHY 912 and/or coax PHY 914. For example, the coax PHY 914 may be integrated with the processor(s) 902 in a single chip, while the memory 904 and optical PHY 912 are implemented in separate chips. In another example, the optical PHY 912, coax PHY 914, memory 904, and processor(s) 902 are all integrated in a single chip.

Figure 9B:
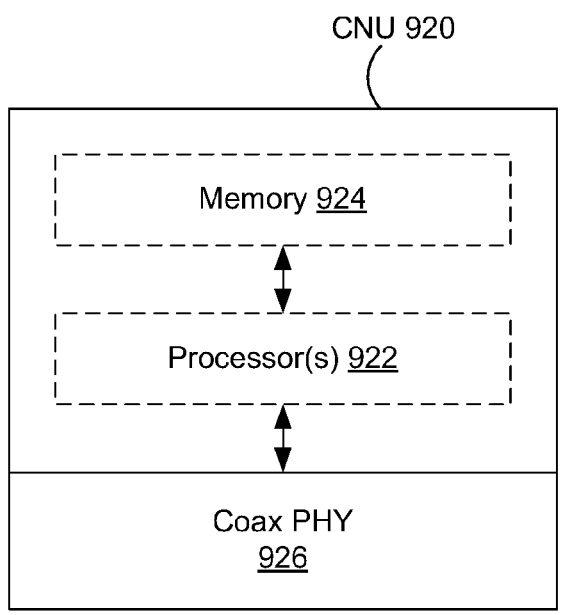
FIG. 9B is a block diagram of a coax network unit in accordance with some embodiments.

FIG. 9B is a block diagram of a CNU 920 in accordance with some embodiments. The CNU 920 is an example of a CNU 140 (FIGS. 1-4A and 7A-7B) (e.g., CNU 516, FIGS. 5A-5B, or CNU 620, FIGS. 6A-6B). In the CNU 920, a coax PHY 926 is coupled to one or more processors (e.g., processor cores) 922, which are coupled in turn to memory 924. In some embodiments, the memory 924 includes a non-transitory computer-readable medium (e.g., one or more nonvolatile memory elements, such as EPROM, EEPROM, Flash memory, a hard disk drive, and so on) that stores instructions for execution by the one or more processors 922. In the example of FIG. 3, the instructions include instructions that, when executed by the processor(s) 902, cause the OCU 900 to implement the functionality of the OAM layer 354, MPCP layer 356, and MAC layer 358. In the example of FIGS. 5A-5B the instructions include instructions that, when executed by the processor(s) 902, cause the CNU 920 to implement the functionality of the optical MAC layer 518 and/or the optical-to-coax convergence layer 520.

While the memory 924 is shown as being separate from the processor(s) 922, all or a portion of the memory 924 may be embedded in the processor(s) 922. In some embodiments, the processor(s) 922 and/or memory 924 are implemented in the same integrated circuit as the coax PHY 926. For example, the coax PHY 926 may be integrated with the processor(s) 922 in a single chip, which may or may not also include the memory 924.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method comprising, at an optical-coax unit (OCU):
    broadcasting a first discovery message to a plurality of coax network units (CNUs);
    in response to the first discovery message, receiving a first registration request from a first CNU of the plurality of CNUs;
    in response to the first registration request, creating a first proxy entity corresponding to the first CNU;
    receiving a second discovery message from an optical line terminal (OLT); and
    in response to the second discovery message, transmitting a second registration request to the OLT requesting registration of the first proxy entity with the OLT.

2. The method of claim 1, further comprising receiving a registration message at the OCU from the OLT in response to the second registration request, wherein the registration message specifies one or more logical link identifiers (LLIDs) for the first proxy entity.

3. The method of claim 2, wherein the one or more LLIDs comprise a plurality of LLIDs corresponding to different levels of service.

4. The method of claim 2, further comprising forwarding the registration message, including the one or more LLIDs, from the OCU to the first CNU.

5. The method of claim 4, further comprising, at the OCU:
    receiving a gate message from the OLT following the registration message;
    in response to the gate message, transmitting a first registration acknowledgment message to the OLT; and
    receiving a second registration acknowledgement message from the first CNU after transmitting the first registration acknowledgment message to the OLT.

6. The method of claim 1, wherein the first proxy entity comprises a virtual optical network unit (ONU) corresponding to the first CNU.

7. The method of claim 6, wherein:
    the virtual ONU comprises a queue to buffer traffic from the first CNU; and
    the method further comprises sending a report message from the virtual ONU to the OLT reporting an amount of traffic in the queue.

8. The method of claim 6, further comprising, in the virtual ONU:
    receiving a report message from the first CNU reporting an amount of traffic queued in the first CNU; and
    sending a report message to the OLT reporting the amount of traffic queued in the first CNU, based on the report message received from the first CNU.

9. The method of claim 1, further comprising, at the OCU:
    broadcasting a third discovery message to the plurality of CNUs;
    in response to the third discovery message, receiving a third registration request from a second CNU of the plurality of CNUs;
    in response to the third registration request, creating a second proxy entity corresponding to the second CNU;
    receiving a fourth discovery message from the OLT; and
    in response to the fourth discovery message, transmitting a fourth registration request to the OLT requesting registration of the second proxy entity with the OLT.

10. An optical-coax unit (OCU), comprising:
    a coax physical layer device to be coupled to a plurality of coax network units (CNUs);
    an optical physical layer device to be coupled to an optical line terminal (OLT);
    one or more processors; and
    memory storing one or more programs configured to be executed by the one or more processors, the one or more programs comprising:
        instructions to broadcast discovery messages to the plurality of CNUs;
        instructions to create proxy entities corresponding to respective CNUs in response to registration requests from the respective CNUs, wherein the registration requests are received from the respective CNUs in response to the broadcasted discovery messages; and
        instructions to transmit registration requests to the OLT requesting registration of the proxy entities with the OLT, in response to discovery messages received from the OLT.

11. The OCU of claim 10, wherein the one or more programs further comprise instructions to assign one or more logical link identifiers (LLIDs) to a respective proxy entity in response to a registration message from the OLT specifying the one or more LLIDs, wherein the registration message is received from the OLT in response to a respective registration request transmitted to the OLT.

12. The OCU of claim 11, wherein the one or more programs further comprise instructions to forward the registration message, including the one or more LLIDs, to a respective CNU that corresponds to the respective proxy entity.

13. The OCU of claim 12, wherein the one or more programs further comprise instructions to transmit a registration acknowledgment message from the respective proxy entity to the OLT in response to the registration message and a subsequent gate message from the OLT, without waiting for a registration acknowledgement message from the respective CNU.

14. The OCU of claim 10, wherein the proxy entities comprise virtual optical network units (ONUs) corresponding to the respective CNUs.

15. The OCU of claim 14, wherein:
the virtual ONUs comprise queues to buffer traffic from the respective CNUs; and
the one or more programs further comprise instructions to send report messages to the OLT based on amounts of traffic in the queues.

16. The OCU of claim 14, wherein the one or more programs further comprise instructions to send reports messages to the OLT reporting amounts of traffic queued in respective CNUs, based on report messages received from the respective CNUs.

17. A non-transitory computer-readable storage medium storing one or more programs configured to be executed by one or more processors of an optical-coax unit (OCU), the one or more programs comprising:
instructions to broadcast discovery messages to a plurality of CNUs;
instructions to create proxy entities corresponding to respective CNUs in response to registration requests from the respective CNUs, wherein the registration requests are received from the respective CNUs in response to the broadcasted discovery messages; and
instructions to transmit registration requests to an OLT requesting registration of the proxy entities with the OLT, in response to discovery messages received from the OLT.

18. The computer-readable storage medium of claim 17, wherein the one or more programs further comprise instructions to assign one or more logical link identifiers (LLIDs) to a respective proxy entity in response to a registration message from the OLT specifying the one or more LLIDs, wherein the registration message is received from the OLT in response to a respective registration request transmitted to the OLT.

19. The computer-readable storage medium of claim 18, wherein the one or more programs further comprise instructions to forward the registration message, including the one or more LLIDs, to a respective CNU that corresponds to the respective proxy entity.

20. The computer-readable storage medium of claim 19, wherein the one or more programs further comprise instructions to transmit a registration acknowledgment message from the respective proxy entity to the OLT in response to the registration message and a subsequent gate message from the OLT, without waiting for a registration acknowledgement message from the respective CNU.

21. The computer-readable storage medium of claim 17, wherein the proxy entities comprise virtual optical network units (ONUs) corresponding to the respective CNUs.

22. The computer-readable storage medium of claim 21, wherein:
the virtual ONUs comprise queues to buffer traffic from the respective CNUs; and
the one or more programs further comprise instructions to send report messages to the OLT based on amounts of traffic in the queues.

23. The computer-readable storage medium of claim 21, wherein the one or more programs further comprise instructions to send reports messages to the OLT reporting amounts of traffic queued in respective CNUs, based on report messages received from the respective CNUs.

24. An optical-coax unit (OCU), comprising:
means for communicating with a plurality of coax network units (CNUs);
means for communicating with an optical line terminal (OLT);
means for creating proxy entities corresponding to respective CNUs in response to registration requests from the respective CNUs, wherein the registration requests are received from the respective CNUs in response to discovery messages broadcasted to the plurality of CNUs; and
means for registering the proxy entities with the OLT.

25. The OCU of claim 24, further comprising means for generating report messages for transmission to the OLT, the report messages reporting traffic associated with respective CNUs.

\* \* \* \* \*